United States Patent [19]
Kitagawa et al.

[11] Patent Number: 5,334,022
[45] Date of Patent: Aug. 2, 1994

[54] AUDITORY PLAYING DEVICE

[75] Inventors: Keiko Kitagawa, Tokyo; Shiro Yasuda, Kanagawa, all of Japan

[73] Assignee: Sony Corporation, Tokyo, Japan

[21] Appl. No.: 937,792

[22] Filed: Aug. 28, 1992

[30] Foreign Application Priority Data

Aug. 30, 1991 [JP] Japan ............... 3-220714

[51] Int. Cl.$^5$ ............... G09B 7/00; G09B 3/00
[52] U.S. Cl. ............... 434/340; 434/335; 434/327
[58] Field of Search ............... 434/335, 338, 340, 362, 434/327

[56] References Cited

U.S. PATENT DOCUMENTS

| | | | |
|---|---|---|---|
| 3,508,349 | 4/1970 | Gilden et al. | 434/335 |
| 3,654,706 | 4/1972 | Perrella | 434/340 X |
| 4,203,344 | 5/1980 | Krosnick | 84/470 R |
| 4,358,278 | 11/1982 | Goldfarb | 434/337 |
| 4,505,682 | 3/1985 | Thompson | 434/335 |
| 4,668,194 | 5/1987 | Narayanan | 434/335 X |
| 4,673,357 | 6/1987 | Ito | 434/335 X |
| 4,729,564 | 3/1988 | Kuna et al. | 434/335 X |
| 5,011,412 | 4/1991 | Rosenberg | 434/227 |
| 5,055,053 | 10/1991 | Nyman | 434/335 X |

FOREIGN PATENT DOCUMENTS

| | | |
|---|---|---|
| 0048835 | 4/1982 | European Pat. Off. |
| 0310766 | 4/1989 | European Pat. Off. |
| 8705142 | 10/1987 | Fed. Rep. of Germany |
| 2186415 | 8/1987 | United Kingdom |
| 2215110 | 9/1989 | United Kingdom ............... 434/308 |

*Primary Examiner*—Gene Mancene
*Assistant Examiner*—Cindy A. Cherichetti
*Attorney, Agent, or Firm*—Pasquale Musacchio; Jerry A. Miller

[57] ABSTRACT

A casing which accommodates an electric circuit for generating sounds of different tones or voice sounds has a recess 11 defined in its upper panel and a loudspeaker 12 disposed therein and mounted on the upper panel for reproducing and radiating sounds or voice sounds. A plurality of tone plates can selectively be placed, one at a time, in the recess. Each of the tone plates has dots and a bar code indicative of a sound or voice sound of its own. When one of the tone plates is inserted in the recess, the dots or bar code is detected by a sensor in the recess, and the electric circuit enables the loudspeaker to reproduce and radiate a tone or voice which is indicated by the inserted tone plate.

13 Claims, 3 Drawing Sheets

AUDITORY PLAYING DEVICE

BACKGROUND OF THE INVENTION

1. Field of the Invention

The present invention relates to an auditory playing device for use in auditory education or as a toy.

2. BACKGROUND

For auditory education to teach children absolute pitches, for example, it has been customary to let them hear the sounds of a tuned piano so that they can memorize the tones. However, it is difficult with this method to keep the children interested in the training even if some game-like element such as guessing of tones is added. The method is therefore not an effective educational process.

It is known that the younger the children who are given auditory education for absolute pitches, for example, the more effective the education process becomes.

OBJECTS AND SUMMARY OF THE INVENTION

It is an object of the present invention to provide a device for effectively educating children, particularly younger children such as preschool children, through an auditory training process involving a game-playing element.

According to the present invention, there is provided an auditory playing device having a plurality of tone plates marked with respective identification codes corresponding to respective sounds. A detector detects an identification code of one of the tone plates which is selected and placed in a predetermined position. A generator generates a sound corresponding to the identification code detector.

The generator may produce an affirmative sound when the identification codes of two tone plates successively placed in the predetermined position agree with each other, and a negative sound when the identification codes of two tone plates successively placed in the predetermined position disagree with each other. Users, particularly younger children such as preschool children, of the auditory playing device can effectively be acoustically trained while playing a game with the device.

The above and other objects, features, and advantages of the present invention will become apparent from the following description of an illustrative embodiment thereof to be read in conjunction with the accompanying drawings, in which like reference numerals represent the same or similar objects.

DETAILED DESCRIPTION OF THE INVENTION

Figure 1:
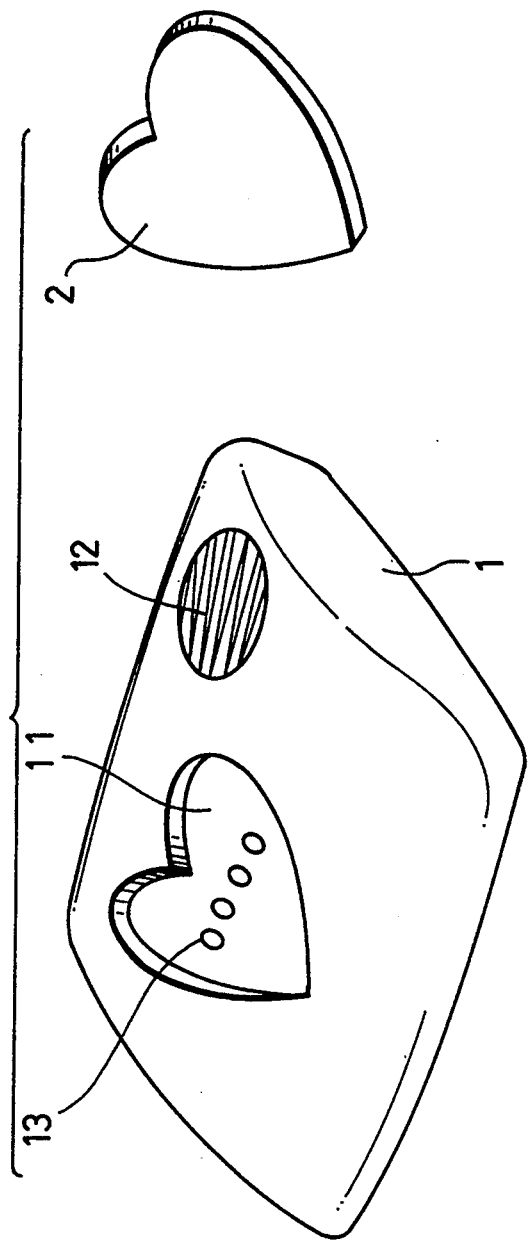
FIG. 1 is a perspective view of an auditory playing device according to the present invention.

As shown in FIG. 1, an auditory playing device according to the present invention includes a casing 1 accommodating an electric circuit (described later). The casing 1 has a recess 11 defined in its upper panel and a loudspeaker 12 disposed therein and mounted on the upper panel for reproducing and radiating sounds of different tones or voice sounds. The auditory playing device also includes a plurality of tone plates 2 (only one is shown In FIG. 1) which can selectively be placed, one at a time, in the recess 11. When one of the tone plates 2 is inserted in the recess 11, the electric circuit enables the loudspeaker 12 to reproduce and radiate a tone or voice which is indicated by the inserted tone plate 2.

Figure 2:
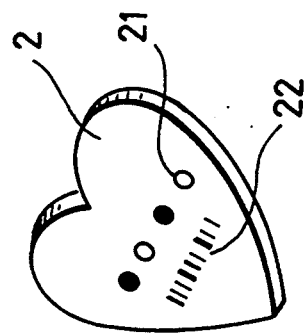
FIG. 2 is a perspective view of a tone plate of the auditory playing device.

As shown in FIG. 2, each of the tone plates 2 has dots 21 and a bar code 22 on its back. The dots 21 and the bar code 22 of a tone plate 2 represent the tone or voice sound to be produced by the loudspeaker 12 when that tone plate 2 is placed In the recess 11. Specifically, each tone plate 2 has an array of dots 21, for example, each coated with either a reflective surface layer or an unreflective surface layer. Therefore, a combination of reflective and unreflective surface layers of dots 21 on a certain tone plate 2 can represent a tone or voice sound peculiar to that tone plate 2. When the tone plate 2 is put in the recess 11, the dots 21 are detected by a sensor assembly 13 (FIG. 1) disposed in the bottom of the recess 11 in alignment with the dots 21.

Figure 3:
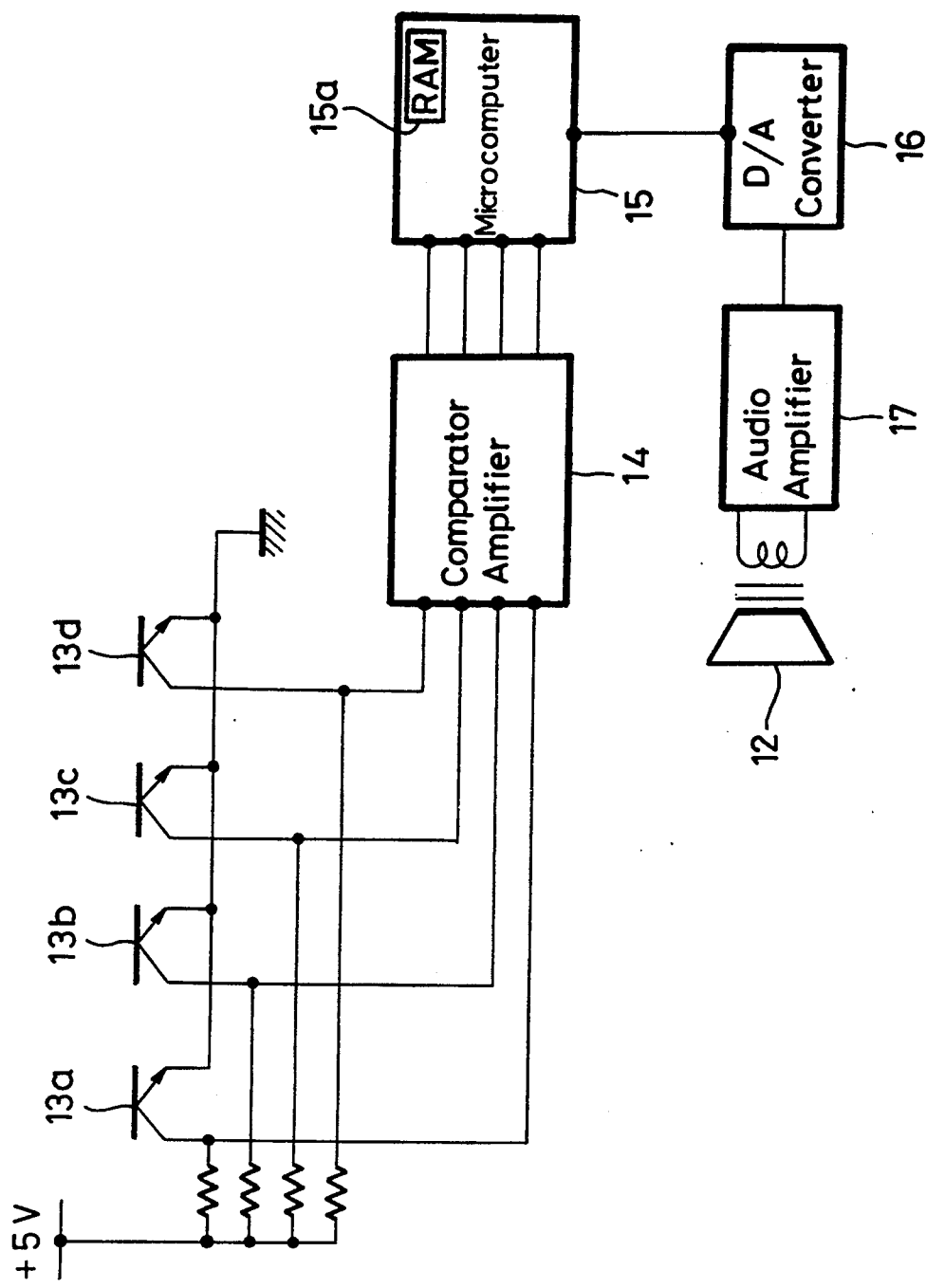
FIG. 3 is a circuit diagram, partly in block form, of an electric circuit of the auditory playing device.

FIG. 3 shows the electric circuit housed in the casing 1. The electric circuit includes a sensor assembly 13 for detecting the dots 21 on a tone plate 2 placed in the recess 11. More specifically, the sensor assembly 13 includes four reflective photosensors 13a, 13b, 13c, 13d each including a light-emitting diode (LED) for emitting light toward a dot 21 on a tone plate 2 inserted in the recess 11, and a phototransistor for detecting light which may be reflected from the dot on the tone plate 2. Signals from the photosensors 13a, 13b, 13c, 13d are sent to a comparator amplifier 14 which converts the signals supplied to a microcomputer 15. The microcomputer 15 includes a CPU, a ROM storing an operation program run by the CPU, a RAM 15a for storing various variables, and an input/output device for transmitting data to and receiving data from external circuits. An output data signal from the microcomputer 15 is converted by a D/A converter 16 into an analog signal which is supplied to an audio amplifier 17 which drives the loudspeaker 12.

When a desired one of the tone plates 2 is inserted in the recess 11, some of the dots 21 which are coated with reflective surface layers on the back of the inserted tone plate 2 are detected by the sensor assembly 13, which supplies detected signals to the microcomputer 15. Microcomputer 15 then selects a tone or voice sound corresponding to the detected dots 21. The microcomputer 15 outputs digital data of the selected tone or voice sound to the D/A converter 16. The D/A converter 16 converts the digital data into an analog signal which is amplified by the audio amplifier 17. The audio amplifier 17 applies the amplified signal to the loudspeaker 12 to cause it to radiate the selected tone or voice sound.

The bar code 22 on each of the tone plates 2 may be detected by a CCD image sensor which may be disposed on the bottom of the comparator amplifier 14.

Figure 4:
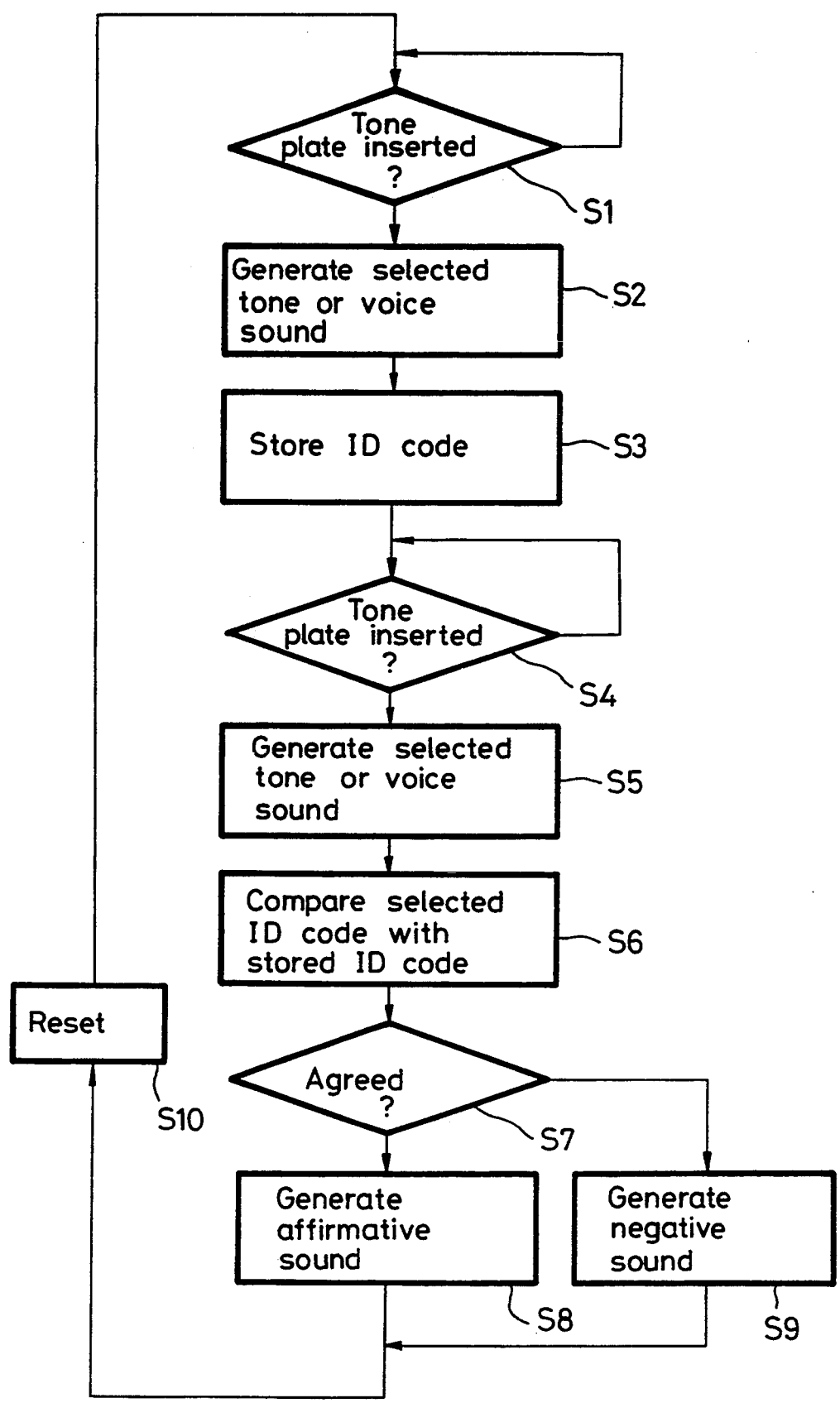
FIG. 4 is a flowchart of an operationed sequence of the auditory playing device.

FIG. 4 shows an operational sequence of the auditory playing device shown in FIG. 1. The operational sequence may be carried out by the CPU of the microcomputer 15 according to the operation program stored in the ROM of the microcomputer 15. As shown in FIG. 4, the CPU determines in a step S1 whether a tone plate 2 has been placed in the recess 11 or not. The step S1 is repeated until a tone plate 2 is placed in the recess 11. If a tone plate 2 has been placed in the recess 11 in the step S1, then a tone or voice sound selected by the computer 15 based on the reflective dot combination on the back of the inserted tone plate 2 is radiated by the loudspeaker 12 in a step S2. Thereafter, an identification code represented by the reflective dot combination on the back of the inserted tone plate 2 is stored at a predetermined address in the RAM 15a of the microcomputer 15 in a step S3.

Then, the CPU determines again in a step S4 whether a tone plate 2 has been placed in the recess 11 or not. The step S4 is repeated until a tone plate 2 is placed in the recess 11. If a tone plate 2 has been placed in the recess 11 in the step S4, then a tone or voice sound selected by the computer 15 based on the reflective dot combination on the back of the inserted tone plate 2 is radiated by the loudspeaker 12 in a step S5. Thereafter, in a step S6, the CPU compares an identification code represented by the reflective dot combination on the back of the inserted tone plate 2 with the identification code stored in the RAM 15a. The CPU determines in a step S7 whether the compared identification codes are the same as each other. If the compared identification codes are the same as each other, then the CPU sends data to control the loudspeaker 12 to radiate an affirmative sound, which may be of any predetermined sound indicative of agreement between the compared identification codes, in a step S8. On the other hand, if the compared identification codes are disagree with each other, then the CPU sends data to control the loudspeaker 12 to radiate a negative sound, which may be of any predetermined sound indicative of disagreement between the compared identification codes, in a step S9. Then, the CPU resets the identification code data stored in the RAM 15a to zero in a step S10, and control returns to the step S1.

Each of the tone plates 2 may have an array of four dots 21, for example. With four dots 21 on each tone plate 2, there may be available a total of 16 ($2^4=16$) different dot combinations on 16 tone plates 2, or a total of 16 tones or voice sounds that can be radiated by the loudspeaker 12. If four tone plates 2 are provided for each of such 16 tones or voice sounds, then a total of 64 tone plates 2 can be used in the auditory playing device. Using such 64 tone plates 2, users, typically younger children such as preschool children, of the auditory playing device can play a game in which an affirmative sound is radiated from the loudspeaker 12 when two out of the 64 tone plates 2, which two tone plates can select the same tones or voice sounds, are successively placed in the recess 11. The microcomputer 15 may transmit output data representative of tones of middle C (261.63 Hz), middle D (293.66 Hz), middle E (329.23 Hz), etc. Therefore, the users can effectively be acoustically trained, particularly for attaining their ability to recognize absolute pitches, while playing such a game.

The CPU of the microcomputer 15 may also be programmed to send data for the loudspeaker 12 to radiate sounds representing a piece of music when certain tone plates 2 are successively selected and placed in the recess 11. Such a program may also be stored in the ROM of the microcomputer 15. The different programs stored in the ROM may be selected by a switch (not shown) on the back of the casing 1.

The auditory playing device allows physically or visually handicapped children or persons to enjoy a combination of tones or voice sounds produced by the device in response to insertion of certain tone plates 2 in the recess 11.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. An auditory playing device comprising:
   a plurality of tone plates each marked with a respective identification code having a pattern of spaced apart dots, each said identification code corresponding to a respective tone;
   an enclosure having a recess for receiving one of said tone plates;
   detecting means for detecting an identification code of one of said tone plates which is selected and placed in a stationary predetermined position within said recess; and
   generating means for generating a single tone corresponding to the identification code detected by said detecting means.

2. An auditory playing device according to claim 1 including first decision means for determining whether one of said tone plates is placed in said predetermined position based on a signal from said detecting means, and instructing said generating means to generate a single tone corresponding to the identification code detected by said detecting means when one of said tone plates is placed in said predetermined position.

3. An auditory playing device according to claim 2, further including second decision means for storing an identification code detected by said detecting means when one of said tone plates is placed in said predetermined position, comparing an identification code detected by said detecting means with said stored identification code when another of said tone plates is placed in said predetermined position, and instructing said generating means to generate a single affirmative tone if the compared identification codes agree with each other.

4. An auditory playing device according to claim 2, further including second decision means for storing an identification code detected by said detecting means when one of said tone plates is placed in said predetermined position, comparing an identification code detected by said detecting means with said stored identification code when another of said tone plates is placed in said predetermined position, and instructing said generating means to generate a negative tone if the compared identification codes disagree with each other.

5. An auditory playing device according to claim 1, wherein said tone plates are marked with respective identification codes corresponding to respective tones, said generating means comprising means for generating a single tone corresponding to the identification code detected by said detecting means.

6. An auditory playing device comprising:
   a plurality of tone plates each marked with a respective identification code having a pattern of spaced apart dots, each said identification code corresponding to a respective tone;
   an enclosure having a recess for receiving one of said tone plates;
   detecting means for detecting an identification code of one of said tone plates which is selected and placed in a stationary predetermined position within said recess;

generating means for generating a tone corresponding to the identification code detected by said detecting means;

first decision means for determining whether one of said tone plates is placed in said predetermined position based on a signal from said detecting means, and for instructing said generating means to generate a tone corresponding to the identification code detected by said detecting means when one of said tone plates is placed in said predetermined position; and second decision means for storing an identification code detected by said detecting means when placed in said predetermined position, comparing an identification code detected by said detecting means with said stored identification code when another of said tone plates is placed in said predetermined position, and instructing said generating means to generate an affirmative tone if the compared identification codes agree with each other.

7. A method for operation of a toy having a recess for receiving a tone plate in a stationary predetermined position, comprising the steps of:

determining that a tone plate has been placed in said recess of said toy;

reading a pattern of spaced apart dots on said tone plate when said tone plate is placed in said stationary predetermined position within said recess;

comparing a code representing said pattern of dots with a stored code;

producing a first tone if said stored code matches said code; and producing a second tone if said stored code does not match said code.

8. The method of claim 7, wherein said pattern of dots are read optically on a basis of reflectiveness of said dots.

9. The method of claim 7, wherein said first tone includes an affirmative tone representing agreement of said codes.

10. The method of claim 7, wherein said second tone includes a negative tone representing disagreement of said codes.

11. The method of claim 7, wherein said stored code is stored in a Random Access Memory (RAM).

12. The method of claim 7, preceeded by the steps of:

determining that a first tone plate is insterted into said recess;

reading a dot pattern from said first tone plate; and storing a code representing said dot pattern as said stored code.

13. The method of claim 7, wherein said dot pattern includes four dots.

* * * * *